(12) United States Patent
Hannuksela

(10) Patent No.: US 7,403,660 B2
(45) Date of Patent: Jul. 22, 2008

(54) ENCODING PICTURE ARRANGEMENT PARAMETER IN PICTURE BITSTREAM

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 603 days.

(21) Appl. No.: 10/427,714

(22) Filed: Apr. 30, 2003

(65) Prior Publication Data

US 2004/0218816 A1 Nov. 4, 2004

(51) Int. Cl.
G06K 9/00 (2006.01)
G06K 9/36 (2006.01)
H04N 7/12 (2006.01)
H04N 11/02 (2006.01)
H04B 1/66 (2006.01)

(52) U.S. Cl. .............. 382/232; 382/106; 382/107; 348/384.1; 375/240; 375/240.01

(58) Field of Classification Search ......... 382/106–107, 382/232–253; 375/240, 240.01–240.24; 348/384.1–431.1
See application file for complete search history.

(56) References Cited

U.S. PATENT DOCUMENTS

| | | | | |
|---|---|---|---|---|
| 5,049,991 A | * | 9/1991 | Niihara | 375/240.16 |
| 5,095,366 A | * | 3/1992 | Ishikawa | 348/409.1 |
| 5,132,792 A | * | 7/1992 | Yonemitsu et al. | 375/240.16 |
| 5,249,048 A | * | 9/1993 | Sugiyama | 348/415.1 |
| 5,267,035 A | * | 11/1993 | Weckenbrock et al. | 348/416.1 |
| 5,331,436 A | * | 7/1994 | Ida et al. | 348/415.1 |
| 5,481,307 A | * | 1/1996 | Goldstein et al. | 375/240.25 |
| 5,510,840 A | | 4/1996 | Yonemitsu et al. | |
| 5,684,714 A | * | 11/1997 | Yogeshwar et al. | 375/240.04 |
| 5,784,494 A | | 7/1998 | Strongin et al. | |
| 5,790,196 A | * | 8/1998 | Sun et al. | 375/240.05 |
| 5,831,688 A | * | 11/1998 | Yamada et al. | 348/699 |
| 5,841,475 A | * | 11/1998 | Kurihara et al. | 375/240.15 |
| 6,295,376 B1 | * | 9/2001 | Nakaya | 382/236 |
| 6,310,915 B1 | | 10/2001 | Wells et al. | |
| 6,459,811 B1 | * | 10/2002 | Hurst, Jr. | 382/232 |
| 6,519,287 B1 | * | 2/2003 | Hawkins et al. | 375/240.16 |
| 6,993,080 B2 | * | 1/2006 | Saunders et al. | 375/240.25 |

(Continued)

OTHER PUBLICATIONS

R. Kurceren and M. Karczewicz, "SP-frame demonstrations," ITU-Telecommunications Standardization Sector, Study Group 16, Question 6, Video Coding Experts Group, 14th meeting, Santa Barbara, CA, USA, Sep. 24-27, 2001, 4 pages.

(Continued)

*Primary Examiner*—Jingge Wu
*Assistant Examiner*—Manav Seth

(57) ABSTRACT

Encoded pictures comprise one or more independently decodable frames, reference frames, and predicted frames. In the method an arrangement step is performed for arranging the pictures in an encoding order, and information on the presentation order is defined for the encoded pictures. Further in the method, a transmission step is performed for transmitting said encoded pictures to a decoder, a decoding step for decoding the encoded pictures for forming decoded pictures, and rearranging step for arranging the decoded pictures in presentation order. An expected increment value of the presentation order per picture is defined, and a parameter indicative of the difference between the expected increment value and the real increment value is calculated. The calculated parameter is VLC coded, and the VLC coded parameter is transmitted, wherein the VLC coded parameter is used in the decoder for arranging the decoded pictures in correct presentation order.

30 Claims, 4 Drawing Sheets

U.S. PATENT DOCUMENTS

2002/0067768 A1 6/2002 Hurst
2002/0126756 A1* 9/2002 Watabe et al. .......... 375/240.12
2003/0035484 A1 2/2003 Prakash et al.
2003/0035587 A1 2/2003 Youn
2003/0128766 A1 7/2003 Tahara et al.

OTHER PUBLICATIONS

European Office Action issued Jan. 21, 2008 in corresponding European Patent Application No. 04730281.5.

XP010639152 - 3-d Motion Vector Coding With Block Base Adaptive Interpolation Filter On H.264; Kimata et al; NTT Cyber Space Laboratories, NTT Corporation; Apr. 6, 2003.

* cited by examiner

ENCODING PICTURE ARRANGEMENT PARAMETER IN PICTURE BITSTREAM

FIELD OF THE INVENTION

The present invention relates to a method for encoding and decoding pictures, including defining a first value for use at a decoding phase to arrange decoded encoded pictures, and defining a second value indicating an expected value of the first value. The invention also relates to a system, transmitting device, receiving device, an encoder, a decoder, an electronic device, a software program, a storage medium, and a signal.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.

Video Communication Systems

Video communication systems can be divided into conversational and non-conversational systems. Conversational systems include video conferencing and video telephony. Examples of such systems include ITU-T Recommendations H.320, H.323, and H.324 that specify a video conferencing/telephony system operating in ISDN, IP, and PSTN networks respectively. Conversational systems are characterized by the intent to minimize the end-to-end delay (from audio-video capture to the far-end audio-video presentation) in order to improve the user experience.

Non-conversational systems include playback of stored content, such as Digital Versatile Disks (DVDs) or video files stored in a mass memory of a playback device, digital TV, and streaming. A short review of the most important standards in these technology areas is given below.

A dominant standard in digital video consumer electronics today is MPEG-2, which includes specifications for video compression, audio compression, storage, and transport. The storage and transport of coded video is based on the concept of an elementary stream. An elementary stream consists of coded data from a single source (e.g. video) plus ancillary data needed for synchronization, identification and characterization of the source information. An elementary stream is packetized into either constant-length or variable-length packets to form a Packetized Elementary Stream (PES). Each PES packet consists of a header followed by stream data called the payload. PES packets from various elementary streams are combined to form either a Program Stream (PS) or a Transport Stream (TS). PS is aimed at applications having negligible transmission errors, such as store-and-play type of applications. TS is aimed at applications that are susceptible of transmission errors. However, TS assumes that the network throughput is guaranteed to be constant.

There is a standardization effort going on in a Joint Video Team (JVT) of ITU-T and ISO/IEC. The work of JVT is based on an earlier standardization project in ITU-T called H.26L. The goal of the JVT standardization is to release the same standard text as ITU-T Recommendation H.264 and ISO/IEC International Standard 14496-10 (MPEG-4 Part 10). The draft standard is referred to as the JVT coding standard in this application, and the codec according to the draft standard is referred to as the JVT codec.

In the following, some terms relating to video information are defined for clarity. A frame contains an array of luma samples and two corresponding arrays of chroma samples. A frame consists of two fields, a top field and a bottom field. A field is an assembly of alternate rows of a frame. A picture is either a frame or a field. A coded picture is either a coded field or a coded frame. In the JVT coding standard, a coded picture consists of one or more slices. A slice consists of an integer number of macroblocks, and a decoded macroblock corresponds a 16×16 block of luma samples and two corresponding blocks of chroma samples. In the JVT coding standard, a slice is coded according to one of the following coding types: I (intra), P (predicted), B (bi-predictive), SI (switching intra), SP (switching predicted). A coded picture is allowed to contain slices of different types. All types of pictures can be used as reference pictures for P, B, and SP slices. The instantaneous decoder refresh (IDR) picture is a particular type of a coded picture including only slices with I or SI slice types. No subsequent picture can refer to pictures that are earlier than the IDR picture in decoding order. In some video coding standards, a coded video sequence is an entity containing all pictures in the bitstream before the end of a sequence mark. In the JVT coding standard, a coded video sequence is an entity containing all coded pictures from an IDR picture (inclusive) to the next IDR picture (exclusive) in decoding order. In other words, a coded video sequence according to the JVT coding standard corresponds to a closed group of pictures (GOP) according to MPEG-2 video.

The codec specification itself distinguishes conceptually between a video coding layer (VCL), and a network abstraction layer (NAL). The VCL contains the signal processing functionality of the codec, things such as transform, quantization, motion search/compensation, and the loop filter. It follows the general concept of most of today's video codecs, a macroblock-based coder that utilizes inter picture prediction with motion compensation, and transform coding of the residual signal. The output of the VCL are slices: a bit string that contains the macroblock data of an integer number of macroblocks, and the information of the slice header (containing the spatial address of the first macroblock in the slice, the initial quantization parameter, and similar). Macroblocks in slices are ordered in scan order unless a different macroblock allocation is specified, using the so-called Flexible Macroblock Ordering syntax. In-picture prediction is used only within a slice.

The NAL encapsulates the slice output of the VCL into Network Abstraction Layer Units (NALUs), which are suitable for the transmission over packet networks or the use in packet oriented multiplex environments. JVT's Annex B defines an encapsulation process to transmit such NALUs over byte-stream oriented networks.

The optional reference picture selection mode of H.263 and the NEWPRED coding tool of MPEG-4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Parameter Set Concept

One very fundamental design concept of the JVT codec is to generate self-contained packets, to make mechanisms such as the header duplication unnecessary. The way how this was achieved is to decouple information that is relevant to more than one slice from the media stream. This higher layer meta information should be sent reliably, asynchronously and in advance from the RTP packet stream that contains the slice packets. This information can also be sent in-band in such applications that do not have an out-of-band transport channel appropriate for the purpose. The combination of the higher level parameters is called a Parameter Set. The Parameter Set contains information such as picture size, display window, optional coding modes employed, macroblock allocation map, and others.

In order to be able to change picture parameters (such as the picture size), without having the need to transmit Parameter Set updates synchronously to the slice packet stream, the encoder and decoder can maintain a list of more than one Parameter Set. Each slice header contains a codeword that indicates the Parameter Set to be used. According to the JVT coding standard, there exist two kinds of parameter sets: one for the sequence (sequence parameter set) and one for the pictures (picture parameter set).

This mechanism allows to decouple the transmission of the Parameter Sets from the packet stream, and transmit them by external means, e.g. as a side effect of the capability exchange, or through a (reliable or unreliable) control protocol. It may even be possible that they get never transmitted but are fixed by an application design specification.

Transmission Order

In conventional video coding standards, the decoding order of pictures is the same as the display order except for B pictures. A block in a conventional B picture can be bi-directionally temporally predicted from two reference pictures, where one reference picture is temporally preceding and the other reference picture is temporally succeeding in display order. Only the latest reference picture in decoding order can succeed the B picture in display order (exception: interlaced coding in H.263 where both field pictures of a temporally subsequent reference frame can precede a B picture in decoding order). A conventional B picture cannot be used as a reference picture for temporal prediction, and therefore a conventional B picture can be disposed without affecting the decoding of any other pictures.

The JVT coding standard includes the following novel technical features compared to earlier standards:

- The decoding order of pictures is decoupled from the display order. The frame number indicates decoding order and the picture order count indicates the display order.
- Reference pictures for a block in a B picture can either be before or after the B picture in display order. Consequently, a B picture stands for a bi-predictive picture instead of a bi-directional picture.
- Pictures that are not used as reference pictures are marked explicitly. A picture of any type (intra, inter, B, etc.) can either be a reference picture or a non-reference picture. (Thus, a B picture can be used as a reference picture for temporal prediction of other pictures.)
- A picture can contain slices that are coded with a different coding type. In other words, a coded picture may consist of an intra-coded slice and a B-coded slice, for example.

Decoupling of display order from decoding order can be beneficial from compression efficiency and error resiliency point of view.

An example of a prediction structure potentially improving compression efficiency is presented in FIG. 1. Boxes indicate pictures, capital letters within boxes indicate coding types, numbers within boxes are frame numbers according to the JVT coding standard, and arrows indicate prediction dependencies. Note that picture B17 is a reference picture for pictures B18. Compression efficiency is potentially improved compared to conventional coding, because the reference pictures for pictures B18 are temporally closer compared to conventional coding with PBBP or PBBBP coded picture patterns. Compression efficiency is potentially improved compared to conventional PBP coded picture pattern, because part of reference pictures are bi-directionally predicted.

FIG. 2 presents an example of the intra picture postponement method that can be used to improve error resiliency. Conventionally, an intra picture is coded immediately after a scene cut or as a response to an expired intra picture refresh period, for example. In the intra picture postponement method, an intra picture is not coded immediately after a need to code an intra picture arises, but rather a temporally subsequent picture is selected as an intra picture. Each picture between the coded intra picture and the conventional location of an intra picture is predicted from the next temporally subsequent picture. As FIG. 2 shows, the intra picture postponement method generates two independent inter picture prediction chains, whereas conventional coding algorithms produce a single inter picture chain. It is intuitively clear that the two-chain approach is more robust against erasure errors than the one-chain conventional approach. If one chain suffers from a packet loss, the other chain may still be correctly received. In conventional coding, a packet loss always causes error propagation to the rest of the inter picture prediction chain.

Two types of ordering and timing information have been conventionally associated with digital video: decoding and presentation order. A closer look at the related technology is taken below.

A decoding timestamp (DTS) indicates the time relative to a reference clock that a coded data unit is supposed to be decoded. If DTS is coded and transmitted, it serves for two purposes: First, if the decoding order of pictures differs from their output order, DTS indicates the decoding order explicitly. Second, DTS guarantees a certain pre-decoder buffering behavior provided that the reception rate is close to the transmission rate at any moment. In networks where the end-to-end latency varies, the second use of DTS plays no or little role. Instead, received data is decoded as fast as possible provided that there is room in the post-decoder buffer for uncompressed pictures.

Carriage of DTS depends on the communication system and video coding standard in use. In MPEG-2 Systems, DTS can optionally be transmitted as one item in the header of a PES packet. In the JVT coding standard, DTS can optionally be carried as a part of Supplemental Enhancement Information (SEI), and it is used in the operation of the optional Hypothetical Reference Decoder. In ISO Base Media File Format, DTS is dedicated its own box type, Decoding Time to Sample Box. In many systems, such as RTP-based streaming systems, DTS is not carried at all, because decoding order is assumed to be the same as transmission order and exact decoding time does not play an important role.

H.263 optional Annex U and Annex W.6.12 specify a picture number that is incremented by 1 relative to the previous reference picture in decoding order. In the JVT coding standard, the frame number coding element is specified similarly to the picture number of H.263. According to the JVT coding standard, frame number is reset to 0 at an IDR picture.

H.263 picture number can be used to recover the decoding order of reference pictures. Similarly, the JVT frame number can be used to recover the decoding order of frames between an IDR picture (inclusive) and the next IDR picture (exclusive) in decoding order. However, because the complementary reference field pairs (consecutive pictures coded as fields that are of different parity) share the same frame number, their decoding order cannot be reconstructed from the frame numbers.

The H.263 picture number or JVT frame number of a non-reference picture is specified to be equal to the picture or frame number of the previous reference picture in decoding order plus 1. If several non-reference pictures are consecutive in decoding order, they share the same picture or frame number. The picture or frame number of a non-reference picture is also the same as the picture or frame number of the following reference picture in decoding order. The decoding order of consecutive non-reference pictures can be recovered using the Temporal Reference (TR) coding element in H.263 or the Picture Order Count (POC) concept of the JVT coding standard.

The value of picture or frame number has a certain maximum. The next increment after the maximum value causes picture or frame number to be equal to 0. Typically, the value of picture or frame number is coded and transmitted as an N-bit unsigned integer, and consequently the maximum value of picture or frame number is equal to $2^N-1$.

A presentation timestamp (PTS) indicates the time relative to a reference clock when a picture is supposed to be displayed. A presentation timestamp is also called a display timestamp, output timestamp, and composition timestamp.

Carriage of PTS depends on the communication system and video coding standard in use. In MPEG-2 Systems, PTS can optionally be transmitted as one item in the header of a PES packet. In the JVT coding standard, PTS can optionally be carried as a part of Supplemental Enhancement Information (SEI), and it is used in the operation of the Hypothetical Reference Decoder. In ISO Base Media File Format, PTS is dedicated its own box type, Composition Time to Sample Box where the presentation timestamp is coded relative to the corresponding decoding timestamp. In RTP, the RTP timestamp in the RTP packet header corresponds to PTS.

Conventional video coding standards feature the Temporal Reference (TR) coding element that is similar to PTS in many aspects. The value of TR is formed by incrementing its value in the temporally-previous reference picture header by one plus the number of skipped or non-reference pictures at the picture clock frequency since the previously transmitted one. TR is typically coded as a fixed-length (N-bit) unsigned integer, and therefore modulo $2^N$ arithmetic is used in calculations with TR. In some of the conventional coding standards, such as MPEG-2 video, TR is reset to zero at the beginning of a Group of Pictures (GOP).

In the JVT coding standard, there is no concept of time in the video coding layer. Picture order count is defined to be a variable having a value that increases with increasing picture position in output order relative to the previous IDR picture in decoding order or relative to the previous picture containing the memory management control operation that marks all reference pictures as "unused for reference". Picture order count is derived for each frame and field. In the JVT coding standard picture order counts are used to determine initial picture orderings for reference pictures in the decoding of B slices, to represent picture order differences between frames or fields for motion vector derivation in temporal direct mode, for implicit mode weighted prediction in B slices, and for decoder output order conformance checking. Many encoders set picture order count proportional to sampling time of pictures.

Transmission of Multimedia Streams

A multimedia streaming system consists of a streaming server and a number of players, which access the server via a network. The network is typically packet-oriented and provides little or no means to guaranteed quality of service. The players fetch either pre-stored or live multimedia content from the server and play it back in real-time while the content is being downloaded. The type of communication can be either point-to-point or multicast. In point-to-point streaming, the server provides a separate connection for each player. In multicast streaming, the server transmits a single data stream to a number of players, and network elements duplicate the stream only if it is necessary.

When a player has established a connection to a server and requested for a multimedia stream, the server begins to transmit the desired stream. The player does not start playing the stream back immediately, but rather it typically buffers the incoming data for a few seconds. Herein, this buffering is referred to as initial buffering. Initial buffering helps to maintain pauseless playback, because, in case of occasional increased transmission delays or network throughput drops, the player can decode and play buffered data.

Transmission Errors

There are two main types of transmission errors, namely bit errors and packet errors. Bit errors are typically associated with a circuit-switched channel, such as a radio access network connection in mobile communications, and they are caused by imperfections of physical channels, such as radio interference. Such imperfections may result into bit inversions, bit insertions and bit deletions in transmitted data. Packet errors are typically caused by elements in packet-switched networks. For example, a packet router may become congested; i.e. it may get too many packets as input and cannot output them at the same rate. In this situation, its buffers overflow, and some packets get lost. Packet duplication and packet delivery in different order than transmitted are also possible but they are typically considered to be less common than packet losses. Packet errors may also be caused by the implementation of the used transport protocol stack. For example, some protocols use checksums that are calculated in the transmitter and encapsulated with source-coded data. If there is a bit inversion error in the data, the receiver cannot end up into the same checksum, and it may have to discard the received packet.

Second (2G) and third generation (3G) mobile networks, including GPRS, UMTS, and CDMA-2000, provide two basic types of radio link connections, acknowledged and non-acknowledged. An acknowledged connection is such that the integrity of a radio link frame is checked by the recipient (either the Mobile Station, MS, or the Base Station Subsystem, BSS), and, in case of a transmission error, a retransmission request is given to the other end of the radio link. Due to link layer retransmission, the originator has to buffer a radio link frame until a positive acknowledgement for the frame is received. In harsh radio conditions, this buffer may overflow and cause data loss. Nevertheless, it has been shown that it is beneficial to use the acknowledged radio link protocol mode for streaming services. A non-acknowledged connection is such that erroneous radio link frames are typically discarded.

Most video compression algorithms generate temporally predicted INTER or P pictures. As a result, a data loss in one picture causes visible degradation in the consequent pictures that are temporally predicted from the corrupted one. Video communication systems can either conceal the loss in displayed images or freeze the latest correct picture onto the screen until a frame which is independent from the corrupted frame is received.

In conventional video coding standards, the decoding order is coupled with the output order. In other words, the decoding order of I and P pictures is the same as their output order, and the decoding order of a B picture immediately follows the decoding order of the latter reference picture of the B picture in output order. Consequently, it is possible to recover the decoding order based on known output order. The output order is typically conveyed in the elementary video bitstream in the Temporal Reference (TR) field and also in the system multiplex layer, such as in the RTP header. Thus, in conventional video coding standards, the presented problem did not exist.

Buffering

Streaming clients typically have a receiver buffer that is capable of storing a relatively large amount of data. Initially, when a streaming session is established, a client does not start playing the stream back immediately, but rather it typically buffers the incoming data for a few seconds. This buffering helps to maintain continuous playback, because, in case of occasional increased transmission delays or network throughput drops, the client can decode and play buffered data. Otherwise, without initial buffering, the client has to freeze the display, stop decoding, and wait for incoming data. The buffering is also necessary for either automatic or selective retransmission in any protocol level. If any part of a picture is lost, a retransmission mechanism may be used to resend the lost data. If the retransmitted data is received before its scheduled decoding or playback time, the loss is perfectly recovered.

SUMMARY OF THE INVENTION

The invention enables the transmission of information related to the temporal reference and/or picture order count in a size reduced manner. In the invention a parameter indicative of the difference between the expected increment value and the real increment value is calculated, the calculated parameter is coded with variable-length coding such as Huffman coding, arithmetic coding or other types of entropy coding, and the VLC coded parameter is transmitted, wherein the VLC coded parameter is used in the decoder for arranging the decoded pictures in correct presentation order.

In the present invention a sequence-level signalling is defined for specifying an expected temporal reference or picture order count difference per picture number or frame number increment. The temporal reference and picture order count are then coded by calculating an expected temporal reference or picture order count for each picture. Then, the difference between the expected picture order count and the actual picture order count is defined for each picture and transmitted in the bitstream to the receiver. Preferably, the difference value is encoded by variable length coding prior transmission to further reduce the size of information to be transmitted.

In the following description the invention is described by using encoder-decoder based system, but it is obvious that the invention can also be implemented in systems in which the video signals are stored. The stored video signals can be either uncoded signals stored before encoding, encoded signals stored after encoding, or decoded signals stored after encoding and decoding process. For example, an encoder produces bitstreams in decoding order. A file system receives audio and/or video bitstreams which are encapsulated e.g. in decoding order and stored as a file.

The encoding method according to the present invention is primarily characterized by calculating at least one parameter indicative of the difference between the first value and the second value; and coding said at least one parameter into the bitstream. The decoding method according to the present invention is primarily characterized by forming a first value indicating an expected value of the ordering value; decoding at least one parameter from the bitstream to obtain a second value, the at least one decoded parameter being indicative of the difference between the ordering value and the first value; and using the first value and the second value to obtain the ordering value. The system according to the present invention is primarily characterized in comprising calculating means for calculating at least one parameter indicative of the difference between the first value and the second value; a coder for coding said at least one parameter into the bitstream; means for decoding at least one parameter from the bitstream to obtain a second value, the at least one decoded parameter being indicative of the difference between the ordering value and the first value; and means for using the first value and the second value to obtain the ordering value. The transmitting device according to the present invention is primarily characterized by comprising calculating means for calculating at least one parameter indicative of the difference between the first value and the second value; and a coder for coding said at least one parameter into the bitstream. The receiving device according to the present invention is primarily characterized by comprising means for decoding at least one parameter from the bitstream to obtain a second value, the at least one decoded parameter being indicative of the difference between the ordering value and the first value; and means for using the first value and the second value to obtain the ordering value. The software program according to the present invention is primarily characterized by comprising calculating at least one parameter indicative of the difference between the first value and the second value; and coding said at least one parameter into the bitstream. The storage medium according to the present invention is primarily characterized by comprising a software program comprising machine executable steps for decoding at least one parameter from the bitstream to obtain a second value, the at least one decoded parameter being indicative of the difference between the ordering value and the first value; and using the first value and the second value to obtain the ordering value. The carrier wave according to the present invention is primarily characterized by comprising at least one parameter indicative of the difference between the first value and the second value coded into the bitstream.

By using the present invention it is possible to further reduce the amount of information to be transmitted. This can lead to faster transmission rates of multimedia information.

DETAILED DESCRIPTION OF THE INVENTION

Figure 1:
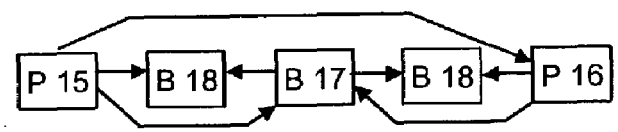
FIG. 1 presents an example of a prediction structure potentially improving compression efficiency.
Figure 2:
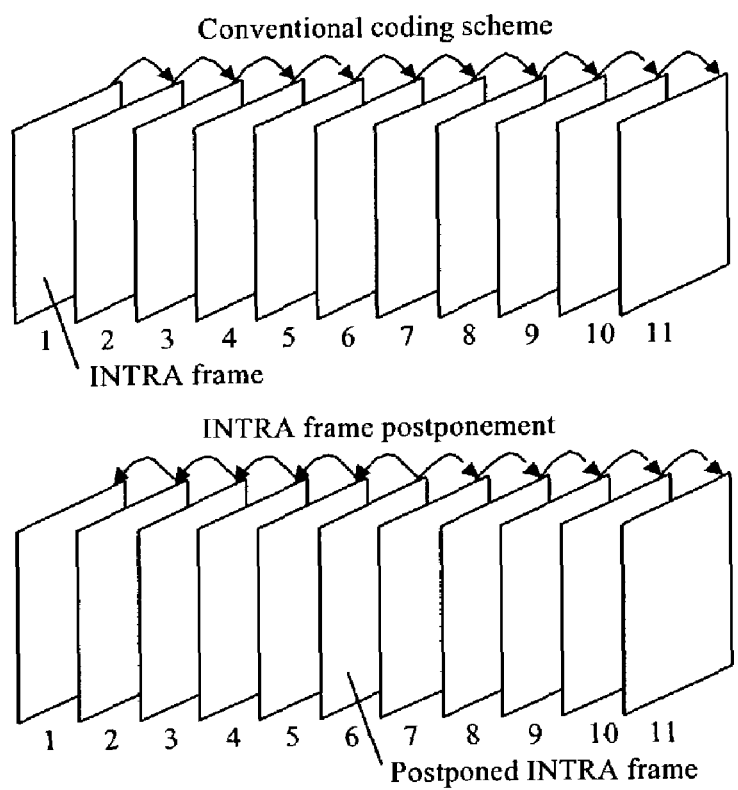
FIG. 2 presents an example of the intra picture postponement method that can be used to improve error resiliency.
Figure 3:
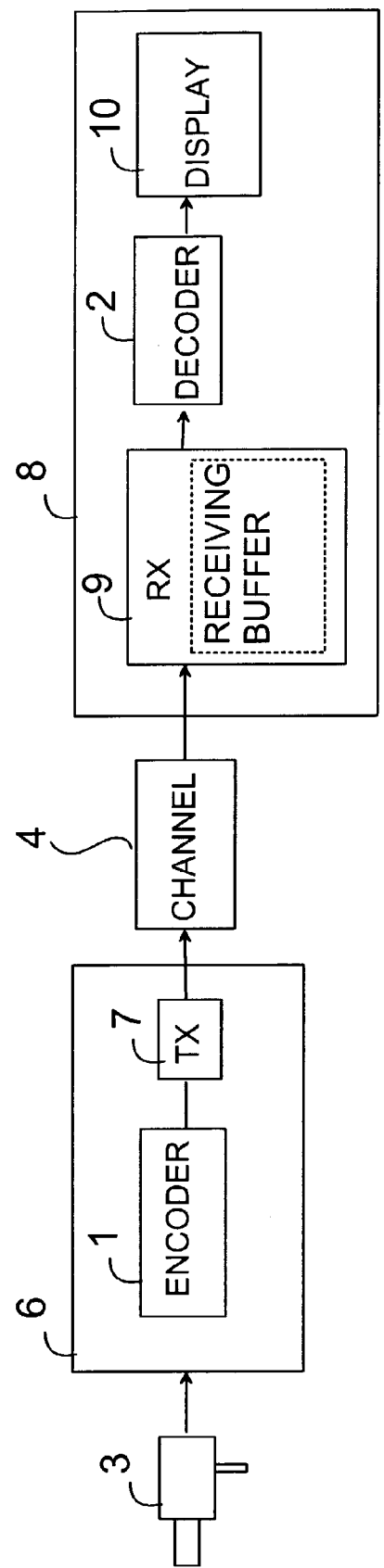
FIG. 3 depicts an advantageous embodiment of the system according to the present invention.
Figure 4:
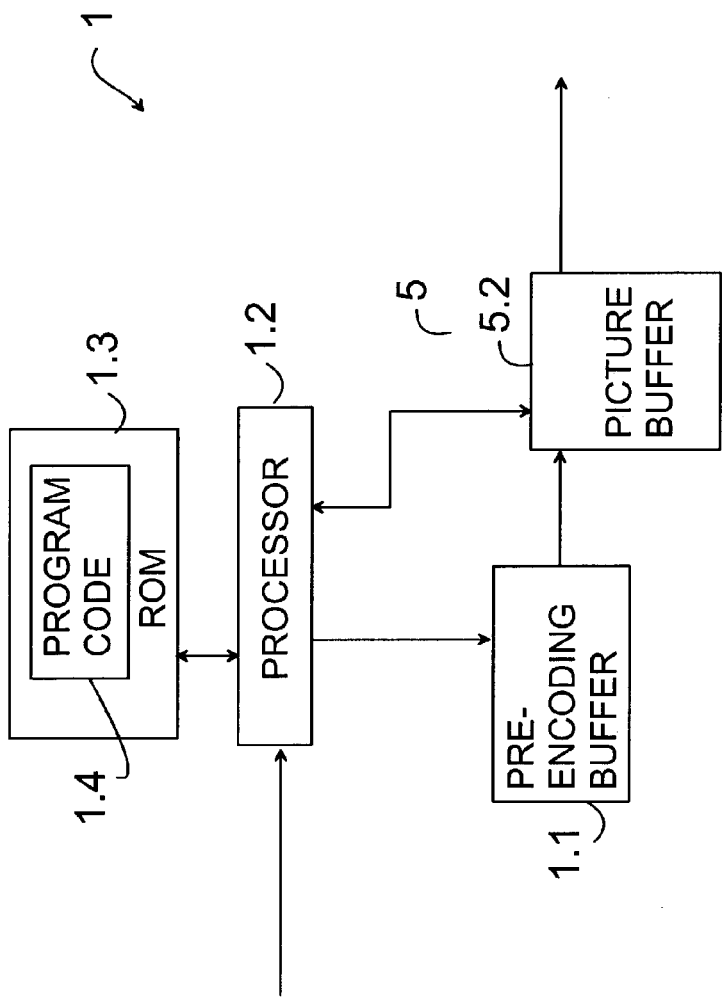
FIG. 4 depicts an advantageous embodiment of the encoder according to the present invention.
Figure 5:
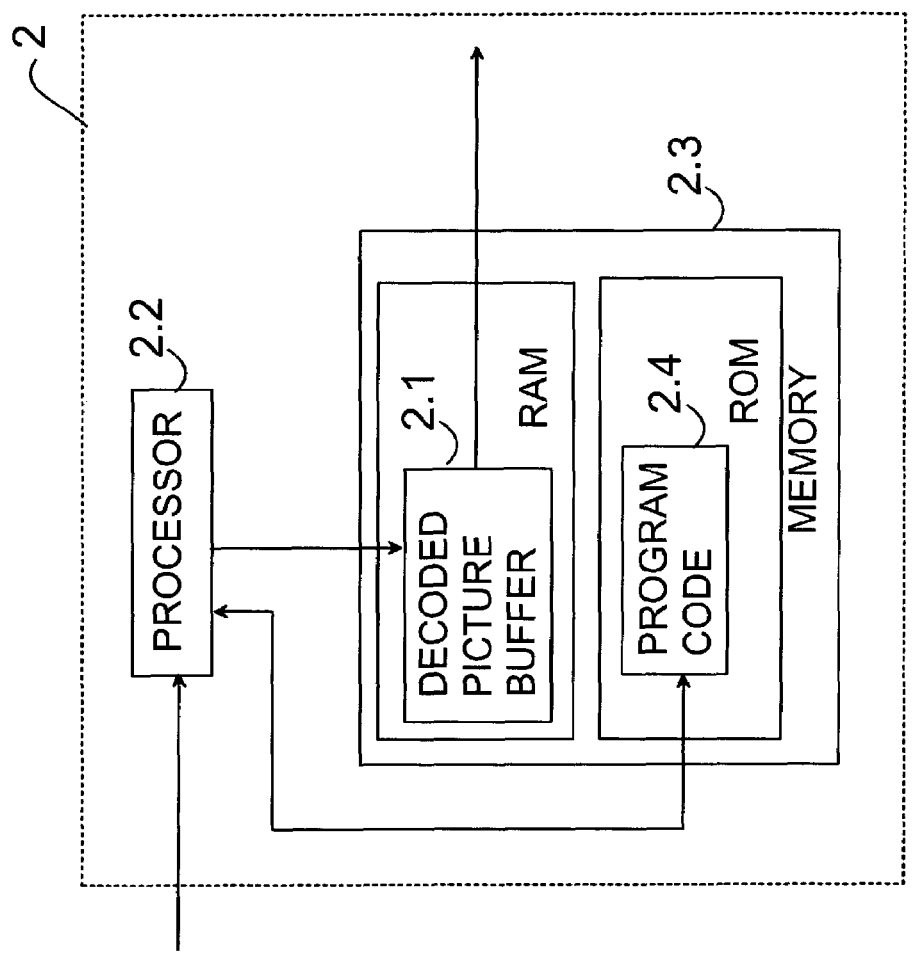
FIG. 5 depicts an advantageous embodiment of the decoder according to the present invention.

In the following the invention will be described in more detail with reference to the system of FIG. 3, the encoder 1 of FIG. 4 and decoder 2 of FIG. 5. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 4) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In the JVT coding standard the display order and the decoding order of the pictures are not necessarily the same, wherein the reference picture has to be stored in a buffer (e.g. in the encoding buffer 1.1) as long as it is used as a reference picture. The encoder 1 may also insert information on display order of the pictures into the bitstream.

From the encoding process the encoded pictures are moved to an encoded picture buffer 5.2, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures. Each decoded picture is buffered in the decoded picture buffer (DPB) 2.1 of the decoder 2 unless it is displayed substantially immediately after the decoding and is not used as a reference picture. Preferably both the reference picture buffering and the display picture buffering are combined and they use the same decoded picture buffer 2.1. This eliminates the need for storing the same pictures in two different places thus reducing the memory requirements of the decoder 2.

The decoder 1 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8.

Encoding

Let us now consider the encoding-decoding process in more detail. Pictures from the video source 3 are entered to the encoder 1 and advantageously stored in the encoding buffer 1.1. The encoding process is not necessarily started immediately after the first picture is entered to the encoder, but after a certain amount of pictures are available in the encoding buffer 1.1. Then the encoder 1 tries to find suitable candidates from the pictures to be used as the reference frames. The encoder 1 then performs the encoding to form encoded pictures. The encoded pictures can be, for example, predicted pictures (P), bi-predictive pictures (B), and/or intra-coded pictures (I). The intra-coded pictures can be decoded without using any other pictures, but other type of pictures need at least one reference picture before they can be decoded. Pictures of any of the above mentioned picture types can be used as a reference picture.

In the following the term temporal reference (TR) is used but it is obvious that the term picture order count (POC) can also be used instead. The temporal reference refers to a presentation timestamp that is relative to the beginning of the current video sequence. The precision and coding mode of temporal references are sequence-level issues. They can only be changed at an IDR picture.

In an advantageous embodiment of the present invention there can exist different temporal reference modes, such as "none", "delta", and "independent" mode. The mode "none" indicates that no temporal references are carried in slice headers. The mode "delta" indicates that temporal references are coded relative to frame numbers. The mode "independent" indicates that the temporal references are coded independently from frame numbers similarly to the standard H.263. In the following only the mode "delta" will be considered in more detail.

In the JVT coding standard, frame number is reset to 0 at an IDR picture. Also the temporal reference is typically reset to 0 at the beginning of a sequence or GOP, and the picture order count is reset to 0 at an IDR picture according to the JVT coding standard. The IDR picture affects that reference picture buffers of the encoder and the decoder are emptied. It is also possible to empty the reference picture buffers and reset the picture order count by a special command (called memory_management_control_operation equal to 5 in the JVT coding standard). The frame number of a non-reference picture is specified to be equal to the frame number of the previous reference picture in decoding order plus 1. If several non-reference pictures are consecutive in decoding order, they share the same frame number. The frame number of a non-reference picture is also the same as the frame number of the following reference picture in decoding order (unless the following reference picture in decoding order is an IDR picture). Let us now consider the following example of coding pattern: IBBPBBP. Let the frames to be coded according to the coding pattern be as follows: I0 B2 B2 P1 B3 B3 P2 . . . , where the numbers indicate the frame numbers. It is also assumed here that the B-frames (B2, B3) are bi-directionally predicted from two encoded frames. It can be seen from the coding pattern that the expected difference of temporal reference per frame number increment is 3. When the encoder encodes the first picture (I0) it resets the temporal reference to zero. Then, the encoder encodes the second reference picture which in this case is the picture P1. The temporal reference of the picture P1 is 3, which can be calculated by multiplying the frame number (1) by the expected difference value (3). Now, the encoder has both reference frames I0, P1 in the memory to predict the B frames in between. The temporal reference of the first B2 frame can be calculated as follows: The frame number (2) is multiplied by the expected difference value (3) which gives a value of 6 as the expected temporal reference value for the first B2 frame. However, the correct order number of the first B2 frame is 1.

Therefore, there is the difference of −5 between the real and expected values. The difference (or error) will be signaled to the receiver as will be described later in this description. The error between the expected and real temporal reference values for the next B2 frame can be calculated similarly. Thus, the expected value is frame number * expected temporal reference value: 2*3=6. The temporal reference prediction error is then real value—predicted temporal reference value: 2−6=−4.

The encoder encodes next the third reference frame P2. The expected and real temporal reference value is 2*3=6. After the P2 frame is encoded the B3 frames between the second P1 and third reference frame P2 can be encoded. The calculation of the error value is similar to the above presented examples. The error value of the first B3 frame is 4−3*3=−5, and the error value of the second B3 frame is 5−3*3=−4.

In another advantageous embodiment the temporal reference value of non-stored picture can be relative to its frame number minus an offset. The offset is preferably either 1 or 2. Thus, if the picture is a non-stored picture the temporal reference value is calculated by:

(frame_num−offset)*expectedDelta*PN*+*TR*PredictionError where frame_num=frame number (without limitations in allowed values), offset=as described above expectedDeltaPN=expected temporal reference difference, TRPredictionError=temporal reference prediction error.

If the picture is a stored picture the temporal reference value is calculated by:

frame_num*expectedDelta*PN*+*TR*PredictionError
temporal reference prediction error In this embodiment the temporal reference prediction errors would be as presented in Table 1 assuming that the frames to be coded are the same as in the previous example: I0 B2 B2 P1 B3 B3 P2. . . .

TABLE 1

| Frame | TR Prediction error | Temporal Reference value |
|---|---|---|
| I0 | 0 | TR = 0 |
| B2 | 1 | TR = (2 − 0) * 3 − 5 = 1 |
| B2 | 2 | TR = (2 − 0) * 3 − 4 = 2 |
| P1 | 0 | TR = 1 * 3 = 3 |
| B3 | 1 | TR = (3 − 0) * 3 − 5 = 4 |
| B3 | 2 | TR = (3 − 0) * 3 − 4 = 5 |
| P2 | 0 | TR = 2 * 3 = 6 |

According to the present invention the expected or real temporal reference value is not transmitted but information on the error value. The error value is preferably VLC-encoded prior transmission. The error value can be VLC-encoded and the VLC-coded value is then transmitted. It is also possible that the absolute value of the error value is VLC-coded and then the VLC-coded value and information on the sign of the error value are transmitted. In yet another advantageous embodiment there is no need to send the error value if it equals 0 but only a flag (for example 1 bit of information) indicating that the error value is 0 is transmitted.

In some systems, such as RTP-based ones, there is no need to explicitly signal a presentation timestamp in the video packet stream, as the information is implicitly carried in transmission protocols. Decoding timestamps are used to control the operation of the pre-decoder buffer. Conversational applications may not need decoding timestamps, as they typically decode as fast as they can. Thus, systems ought to have some freedom to decide, which timestamp information to transmit. In some systems it is necessary to signal the expected temporal reference difference and the temporal reference prediction error to the decoder 2. The error value is signalled for each predicted frame. The expected temporal reference difference is signalled for each group of pictures or less frequently if there are no changes in the value of the expected temporal reference difference between successive group of pictures. The signalling can be performed e.g. by using the Parameter Set mechanism. In the following, an example of slice header information will be described. The slice header include the following fields:

TRPE: (absolute value of Temporal Reference prediction error)+1,

TRPES: Temporal Reference Prediction Error Sign,

TR: Temporal Reference.

TRPE is variable length code and contains the temporal reference prediction error value. If the TRPE is zero, the previously calculated temporal reference for the picture is in effect. When the TRPE is greater than zero, the temporal reference is calculated as follows. The symbol TPN means a cumulative frame number without wrapover (i.e., without a limit on maximum value of frame number). TRPES is present only if TRPE is greater than one. If TRPE=0, no further TR information is carried in this slice header and the value of TR is equal to the one carried in any other slice header of the same picture. If TRPE=1 then TR=TPN*expected temporal reference difference. In a situation in which TRPE>1 the temporal reference prediction error sign (TRPES) is examined. If TRPES=1 (positive error), TR=TPN*expected temporal reference difference+TRPE−1. If TRPES=0 (negative error), TR=TPN* expected temporal reference difference−TRPE+1. In this example the temporal reference prediction error value which is signalled to the decoder is the real temporal reference prediction error value incremented by one. Therefore, the decoder also has to take this into account when it is calculating the correct temporal reference values for each frame.

Decoding

Next, the operation of the receiver 8 will be described. The receiver 8 collects all packets belonging to a picture, bringing them into a reasonable order. The strictness of the order depends on the profile employed. The received packets are stored into the receiving buffer 9.1 (pre-decoding buffer). The receiver 8 discards anything that is unusable, and passes the rest to the decoder 2.

If the decoder 2 has enough frames to begin decoding the decoder starts to decode the frames. First, the correct decoding order needs to be identified. This can be performed by examining e.g. the decoding timestamps of the received frames. As the name implies, the independently decodable frames can be decoded regardless of other frames. Those decoded frames which are reference frames for one or more predicted frames are stored in a reference frame buffer which can be part of the decoded picture buffer 2.1 of the decoder. If the transmission order is such that all the reference frames of any predicted frame are transmitted before the predicted frame the decoder needs not to store the predicted frames and they can be decoded substantially immediately after they are received. The decoded frames need to be ordered in correct order for presentation. This can be done by using the encoded temporal reference prediction error information and the expected temporal reference difference. In the following, an example of the ordering process will be described. In this example it is assumed that the frames are received in the following order: I0 P1 B2 B2 P2 B3 B3. It is also assumed that the temporal reference prediction error of the frames are 0, 0, −5, −4, 0, −5, −4, respectively. The decoder 2 receives information on the expected temporal reference difference. Let it be 3 in this example. The decoder 2 calculates the temporal reference by using the expected temporal reference difference, frame numbers and temporal reference prediction errors for each frames. For the first frame I0 the calculation of the temporal reference value gives, before adding the error, 0 as a result (=0*3). The error is 0, hence the temporal reference value is 0. Similarly, the other temporal reference values can be calculated. The results are presented in Table 2.

TABLE 2

| Frame | TR Prediction error | Temporal Reference value |
|---|---|---|
| I0 | 0 | TR = 0 |
| P1 | 0 | TR = 1 * 3 + 0 = 3 |
| B2 | −5 | TR = 2 * 3 − 5 = 1 |
| B2 | −4 | TR = 2 * 3 − 4 = 2 |
| P2 | 0 | TR = 2 * 3 + 0 = 6 |
| B3 | −5 | TR = 3 * 3 − 5 = 4 |
| B3 | −4 | TR = 3 * 3 − 4 = 5 |

The frames can now be presented in their correct order.

A frame consists of two fields. Picture order count number may be specified for an entire frame or both of its fields separately. The picture order count number of one field of a frame may be coded with another scheme as the picture order count number for the other field of the frame. For example, the picture order count value of the other field of the frame may be coded relative to the first field of the frame.

It is obvious that the present invention is not limited solely to the above described embodiments but it can be modified within the scope of the appended claims.

The invention claimed is:

1. A method for encoding pictures into a bitstream, comprising:
 defining a first value for use at a decoding phase to arrange decoded encoded pictures;
 defining, based on a frame number, a second value indicating an expected value of the first value, the frame number being indicative of a decoding order of encoded pictures;
 calculating at least one parameter indicative of the difference between the first value and the second value; and
 coding said at least one parameter into the bitstream.

2. The method according to the claim 1 further comprising encoding one or more independently decodable pictures and one or more predicted pictures into the bitstream.

3. The method according to the claim 1 further comprising transmitting said encoded pictures to a decoder.

4. The method according to the claim 1 further comprising variable length coding the calculated parameter, and encoding the variable length coded parameter into the bitstream.

5. A method for decoding encoded pictures from a bitstream, wherein an ordering value is formed indicating an order of decoded encoded pictures, comprising:
 forming an expected order value based on a frame number indicating an expected value of the ordering value, the frame number being indicative of a decoding order of encoded pictures;
 decoding at least one parameter from the bitstream, the at least one decoded parameter being indicative of the difference between the ordering value and the expected order value; and
 using the expected order value and the at least one decoded parameter to obtain the ordering value.

6. The method according to the claim 5 further comprising using the ordering value for arranging decoded encoded pictures.

7. The method according to the claim 6 further comprising decoding encoded pictures for forming decoded pictures, and using the ordering value to arrange the decoded encoded pictures in an output order.

8. The method according to the claim 5 further comprising using the ordering value for motion compensation.

9. The method according to the claim 5 further comprising decoding at least one second parameter to be used to derive the expected value from the frame number.

10. An encoder for encoding pictures into a bitstream, comprising:
 calculating device for calculating at least one parameter indicative of the difference between a first value for use at a decoding phase to arrange decoded encoded pictures and a second value, based on a frame number, indicative of an expected value of the first value, the frame number being indicative of a decoding order of encoded pictures; and
 a coder for coding said at least one parameter into the bitstream.

11. A device comprising an encoder for encoding pictures into a bitstream, comprising:
 calculating device for calculating at least one parameter indicative of a difference between a first value for use at a decoding phase to arrange decoded encoded pictures based on the first value and a second value, based on a frame number indicative of a decoding order of encoded pictures; and
 a coder for coding said at least one parameter into the bitstream.

12. The device according to claim 11, comprising an inclusion device for including at least one second parameter in a sequence parameter set.

13. The device according to claim 11, wherein said calculating device is arranged to inform the expected value of the first value in respect of an increment of a frame number.

14. The device according to claim 11, comprising an inclusion device for including said at least one parameter in a slice header.

15. The device according to the claim 11, wherein the coder comprises a variable length coder for variable length coding the calculated parameter, and the device is further configured to encode the variable length coded parameter into the bitstream.

16. A decoder for decoding encoded pictures from a bitstream, wherein an ordering value is formed indicating an order of decoded encoded pictures, wherein the decoder is configured to:
 decode at least one parameter from the bitstream, the at least one decoded parameter indicative of the difference between the ordering value and an expected order value; and
 use the expected order value and the at least one decoded parameter to obtain the ordering value.

17. A device comprising a decoder for decoding encoded pictures from a bitstream, wherein an ordering value is formed indicating an order of decoded encoded pictures, wherein the decoder is configured to:
 derive an expected order value, based on a frame number, indicating an expected value of the ordering value, the frame number being indicative of a decoding order of encoded pictures;
 decode at least one parameter from the bitstream, the at least one decoded parameter indicative of the difference between the ordering value and the expected order value; and
 use the expected order value and the at least one decoded parameter to obtain the ordering value.

18. A client comprising a decoder for decoding encoded pictures from a bitstream, wherein an ordering value is formed indicating an order of decoded encoded pictures, wherein the decoder is configured to:

derive an expected order value, based on a frame number, indicating an expected value of the ordering value the frame number being indicative of a decoding order of encoded pictures;

decode at least one parameter from the bitstream, the at least one decoded parameter indicative of the difference between the ordering value and the expected order value; and use the expected order value and the at least one decoded parameter to obtain the ordering value.

19. A system comprising:

an encoder for encoding pictures into a bitstream, comprising:

calculating device for calculating at least one parameter indicative of the difference between a first value and a second value, said first value for use at a decoding phase to arrange decoded encoded pictures, said second value based on a frame number, indicating an expected value of the first value, the frame number being indicative of a decoding order of encoded pictures; and a coder for coding said at least one parameter into the bitstream, a transmitter, operatively connected to the codes, for transmitting the bitstream to a receiver, a decoder, operatively connected to the receiver, for decoding encoded pictures from the bitstream, wherein an ordering value is formed indicating an order of decoded encoded pictures, wherein the decoder configured to:

derive a third value, based on said frame number, decode at least one parameter from the bitstream, the at least one decoded parameter being indicative of the difference between the ordering value and the third value, and use the third value and the at least one decoded parameter to obtain the ordering value.

20. A computer program product comprising a computer readable storage medium encoded with a computer program for encoding pictures into a bitstream by:

defining a first value for use at a decoding phase to arrange decoded encoded pictures, defining, based on a frame number, a second value indicating an expected value of the first value, the frame number being indicative of a decoding order of encoded pictures, calculating at least one parameter indicative of the difference between the first value and the second value, and coding said at least one parameter into the bitstream.

21. A computer program product comprising a computer readable storage medium encoded with a computer program comprising machine executable steps for decoding, wherein an ordering value is formed indicating an order of decoded encoded pictures, comprising:

forming a first value, based on a frame number, indicating an expected value of the ordering value, the frame number being indicative of a decoding order of encoded pictures, decoding at least one parameter from the bitstream to obtain a second value, the at least one decoded parameter being indicative of the difference between the ordering value and the first value, and using the first value and the second value to obtain the ordering value.

22. The method according to the claim 1 further comprising encoding one or more reference pictures into the bitstream.

23. The method according to the claim 22 further comprising encoding one or more non-reference pictures into the bitstream.

24. The method according to the claim 1 further comprising coding at least one second parameter into the bitstream to be used to derive the expected value from the frame number.

25. The method according to the claim 24 comprising deriving the expected value by multiplying the frame number with said at least one second parameter.

26. The method according to the claim 9 comprising deriving the expected value by multiplying the frame number with said at least one second parameter.

27. The device according to the claim 12 wherein said encoder is configured to encode at least one second parameter into the bitstream to be used to derive the expected value from the frame number.

28. The device according to the claim 27 wherein said encoder is configured to derive the expected value by multiplying the frame number with said at least one second parameter.

29. The device according to the claim 17 wherein said decoder is configured to decode at least one second parameter from the bitstream to be used to derive the expected value.

30. The device according to the claim 29 wherein said decoder is configured to derive the expected value by multiplying the frame number with said at least one second parameter.

* * * * *